Jan. 3, 1956 P. A. HARTER 2,729,318
MAGNETIC CLUTCH WITH STATIONARY WINDING
Filed Dec. 26, 1951
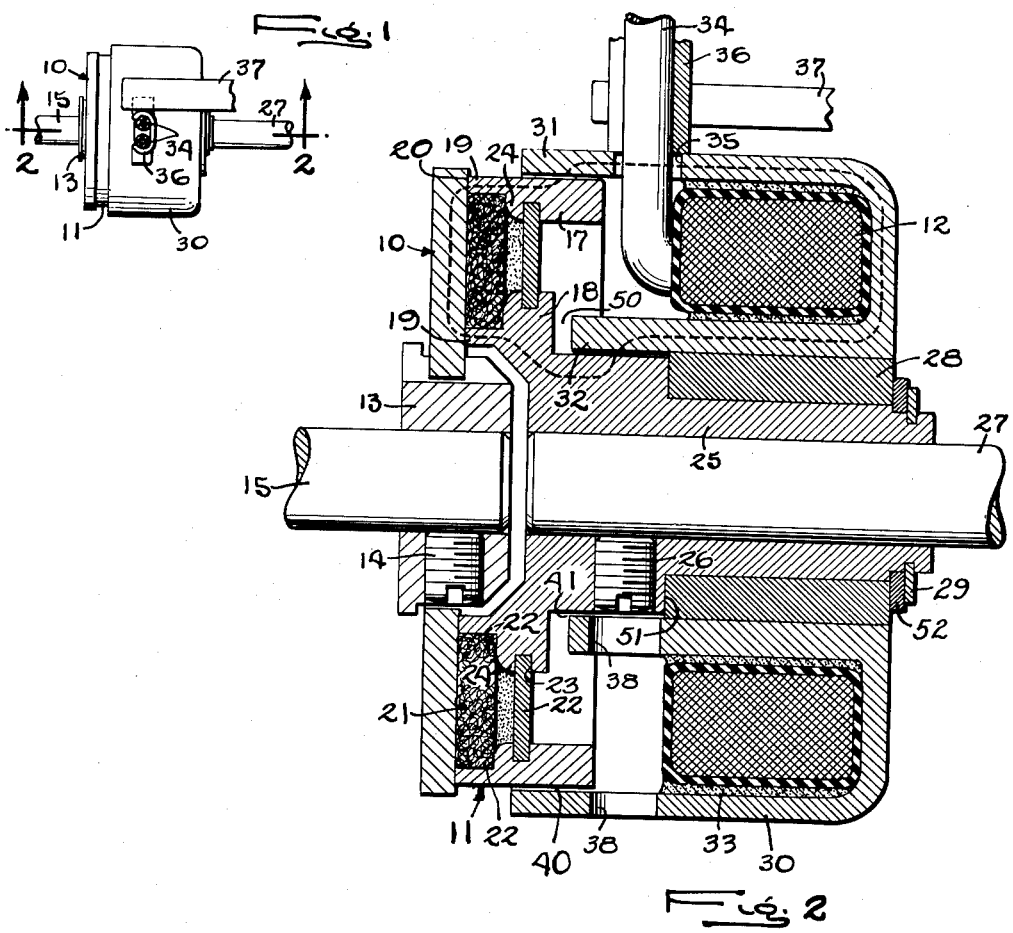
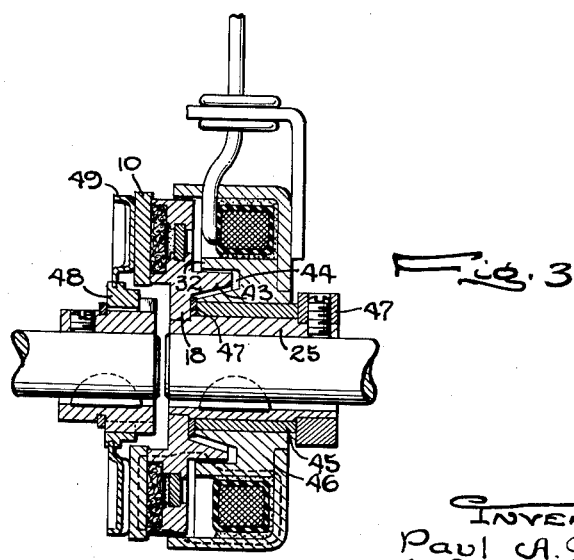
INVENTOR
Paul A. Harter
By Carlson, Pitzner, Hubbard & Wolfe
ATTORNEY United States Patent Office 2,729,318
Patented Jan. 3, 1956

2,729,318

MAGNETIC CLUTCH WITH STATIONARY WINDING

Paul A. Harter, Beloit, Wis., assignor to Warner Electric Brake & Clutch Company, South Beloit, Ill., a corporation of Illinois Application December 26, 1951, Serial No. 263,398

3 Claims. (Cl. 192—84)

This invention relates to electromagnetic clutches of the type having a stationarily mounted winding and a magnetic flux circuit which extends through opposed axially facing working surfaces on the driving and driven elements of the clutch.

The general object is to provide a clutch of the above character in which the concentric rotatable and nonrotatable parts of the magnet are arranged in a novel manner to minimize the over-all radial dimension of the clutch, facilitate mounting of the stationary magnet part, and facilitate low cost production of the parts as by automatic screw machines.

Another object is to provide a clutch of the above character in which the inner and outer pole pieces of the stationary magnet part telescope with and are disposed on the same side of the corresponding pole pieces on the rotary magnet part.

A more detailed object is to locate both of the stationary pole pieces of the magnet externally of the rotary pole pieces.

A further object is to journal the nonrotatable part of the magnet directly on the rotatable part thereof so that the stationary mounting is achieved simply by holding the former part against turning.

Another object is to arrange the rotating and stationary pole pieces in a novel manner to cause the flux to cross radially between each stationary pole piece and the adjacent rotary pole piece and thereby accurately maintain the reluctance of the flux path.

Other objects and advantages of the invention will become apparent from the following detailed description taken in connection with the accompanying drawings, in which Figure 1 is a plan view of a clutch embodying the novel features of the invention.

Fig. 2 is a cross section taken along the line 2—2 of Fig. 1.

Fig. 3 is a view similar to Fig. 2 showing a modification.

In the drawings, the invention is shown for purposes of illustration incorporated in a clutch of the friction type having driving and driven elements 10 and 11 rotatable about a common axis and adapted to be drawn into frictional gripping engagement by magnetic flux threading back and forth through the elements and controlled by energization and deenergization of a stationarily mounted winding 12 encircling the axis. The element 10 constitutes the magnet armature and comprises a flat ring of magnetic material internally toothed and splined onto a collar 13 secured as by a set screw 14 to a shaft 15.

The other clutch element 11 is the rotary part of the magnet and comprises two concentric rings 17 and 18 rigidly connected to but magnetically separated from each other and forming pole pieces 19 terminating at end faces 20 which are flush with each other and are adapted for axial engagement with the face of the armature 10. Segments 21 of nonmagnetic wear resisting material are disposed between the pole pieces 19 and backed by shoulders 22 on the rings 17 and 18 with the outer surfaces of the segments flush with the pole faces 20. In the present instance, rigid connection of the rings 17 and 18 is effected by a flat and narrow ring 22 of stainless steel or other nonmagnetic material suitably secured against shoulders 23 as by swaging metal as indicated at 24 from the rings 17 and 18 over the inner and outer edges of the ring 22.

The inner rotary ring 18 is a flange on one end of a magnetic sleeve 25 fastened as by a set screw 26 to a shaft 27 alined with the shaft 15. The other end of the sleeve is of reduced diameter and has a sleeve 28 of nonmagnetic bearing material journaled thereon and held as by a snap ring 29.

The nonrotatable part 30 of the magnet core is pressed onto the exterior of the sleeve 28 and comprises a ring of magnetic material of U-shaped cross section enclosing the winding 12 and having concentric and cylindrical pole pieces 31 and 32 projecting axially beyond the winding. The latter comprises a multiplicity of turns held in the bottom of the U by suitable binding material 33 with the end portions 34 of the wire extending outwardly through a hole 35 in the outer pole piece 31. These leads may be anchored by a suitable clip or binding 36 rigid with and projecting outwardly from the magnet ring 30. Since the latter is supported on the bearing sleeve 28, its stationary mounting may be achieved simply by providing, in the installation where the clutch is ultimately used, a suitable nonrotatable stop 37 engageable with the projection 36 to hold the ring 30 against turning on its support 25. For some applications the holding force may be applied directly to the leads 34 outwardly beyond their point of anchorage on the binding projection. The outer and inner pole pieces 31 and 32 may be apertured as indicated at 38 to afford access to the head of the set screw 26.

In accordance with one aspect of the present invention, the outer and inner stationary pole pieces 31 and 32 telescope with and are each disposed externally of the rotatable outer and inner rings 17 and 18 whose external surfaces are machined and sized to fit as closely as practicable within the inner peripheral surfaces thus leaving only very narrow air gaps 40 and 41 between the opposed pole piece surfaces. The outer pole piece 31 projects farther from the coil 12 than the inner piece 32 and overlaps the major length of the outer ring 17. The shorter inner stationary pole piece 32 is disposed between the rings 17 and 18 and coacts with the outer periphery of the sleeve 25 to provide the desired large area for the inner air gap 41 which is offset axially relative to the other gap 40.

The bearing sleeve 28 supports the magnet core 30 in a position in which all of the magnetic parts of the pole rings 17 and 18 are spaced axially from the opposed end faces of the pole pieces 31 and 32 a distance equal to at least several times the width of the radial gaps between the cylindrical surfaces 40 and 41 so that the flux path is forced radially across these gaps. The bearing is held against axial shifting relative to the sleeve 25 between a shoulder 51 on the sleeve and a thrust ring 52 which is held in place by the snap ring 29 and this bearing together with the shoulder and the thrust sleeve constitute a thrust means locating the magnet core in the proper position.

In this instance, the magnet core 30 is held so that no magnetic part of the pole rings 17 is disposed opposite the end face of the pole piece 31 while the gap 50 between the pole piece 32 and the ring 18 is of substantial width and has a much higher reluctance than the radial gaps. As a result, the flux path crosses from the pole pieces to the pole rings through the radial gaps which, because both the pole rings and the pole pieces are supported by the sleeve 25, may be accurate and uniform in width to maintain the desired reluctance of the flux path. Also, with the flux path crossing radially from a pole ring to the adjacent pole piece, the axial thrust on the pole rings is reduced and avoids the danger of wearing of the axially engaging parts and the development of end play which would result in a gap between the armature 10 and the pole faces 20.

By virtue of the foregoing arrangement, a high degree of over-all radial as well as axial compactness is achieved along with rugged supporting of the rotating parts of the magnet. At the same time, provision is made for threading of the flux axially through the clutch rings at two radially spaced points thus utilizing the magnetic flux most efficiently in producing the clutching action. All of the surfaces of the rings 17 and 18 which require machining are disposed either externally of the rings or are readily accessible at the ends thus enabling these parts to be made on a mass production basis on automatic screw machines.

The construction as described above provides a toroidal flux path around each part of the winding 12 and as indicated in phantom in Fig. 1, extends axially through the outer stationary pole piece 31, inwardly across the gap 40, axially through the ring 17 and the outer pole face into the armature 10, reversely through the inner pole face and the ring 18, outwardly across the gap 41, and finally along the inner stationary pole piece 32 and around the coil. Owing to the large areas of the gaps 40 and 41, enough flux will thread the circuit above described to fully saturate the iron at the pole faces 20. As a result, the armature and the magnet face are drawn into firm gripping engagement to produce the desired clutching action.

In the modified form of the improved clutch shown in Fig. 3, the over-all axial length has been reduced at only a small sacrifice in diameter by forming on the back of the inner ring 18 an annular flange 43 which projects into a groove 44 in the inner magnet pole piece 32 and partially through the coil 12. Preferably, the inner ring 18 is formed and machined as a separate piece and pressed or brazed onto the sleeve 25 which is keyed to the shaft 27 and journaled in a bearing sleeve 45 pressed into a ring 46 on which the inner magnet pole piece 32 is formed, this ring being positioned axially by thrust collars 47. In this form, the armature 10 comprises a plurality of segments secured to a supporting ring 49 which is attached to a collar 48 in turn splined on the hub 13.

I claim as my invention:

1. In a magnetic clutch, the combination of, an annular non-rotatable magnet ring of U-shaped radial cross section having concentric inner and outer pole pieces, an annular winding within said ring, said outer pole piece projecting axially beyond said inner piece and having an internal cylindrical surface and the inner piece having an axially opening annular groove in its end defined by a cylindrical wall, a rotary sleeve projecting axially through said inner pole piece beyond the grooved end thereof, an inner magnetic pole ring fast on the projecting end of said sleeve and having thereon a flange projecting axially into said groove to telescope closely with said cylindrical wall thereof, an outer magnetic pole ring closely telescoping with said internal surface of said outer pole piece, non-magnetic means rigidly connecting said pole rings for rotation with said sleeve, said pole rings having axially facing and radially spaced pole faces, and an armature ring opposing said pole faces and mounted for frictional gripping engagement therewith.

2. A magnetic clutch having, in combination, a magnet core comprising a ring of radial U-shaped cross section having inner and outer pole pieces with cylindrical surfaces thereon concentric with the ring axis, a multiple turn winding carried by said core and disposed between said pole pieces, magnetically separated but rigidly connected inner and outer pole rings closely telescoping at one of their ends with the outer end portions of the respective pole pieces and coacting with said surfaces to define low reluctance flux gaps of narrow radial width and substantial axial length, the circumferential area of each of said radial gaps being several times the area of said pole face on the associated pole ring, an armature ring spanning the faces of said pole rings at the other ends thereof and adapted for axial gripping engagement with said faces to derive a friction torque, a sleeve rigid with said inner pole ring and projecting beyond the end thereof and toward the closed end of said core, and a nonmagnetic bearing sleeve interposed between said inner pole piece and said sleeve to constitute the latter the sole means of support for said core, said bearing having thrust means associated therewith and acting to locate said core axially relative to said rings in a position in which the end faces of said pole pieces are separated axially from any opposed magnetic part of said rings by a distance several times as great as the radial width of said gaps thereby to confine the flow of flux when said winding is energized to a toroidal path extending through said radial gaps and avoid magnetic end thrust between said rings and core.

3. A magnetic clutch having, in combination, a magnet core comprising a ring of radial U-shaped cross section having inner and outer pole pieces with cylindrical surfaces thereon concentric with the ring axis, a multiple turn winding carried by said core and disposed between said pole pieces, magnetically separated but rigidly connected inner and outer pole rings closely telescoping at one of their ends with the outer end portions of the respective pole pieces and coacting with said surfaces to define low reluctance flux gaps of narrow radial width and substantial axial length, an armature ring spanning the faces of said pole rings at the other ends thereof and adapted for axial gripping engagement with said faces to derive a friction torque, a sleeve rigid with said inner pole ring and projecting beyond the end thereof and toward the closed end of said core, a nonmagnetic bearing interposed between said inner pole piece and said sleeve to constitute the latter the sole means of support for said core and acting to position the core axially with the end faces of said pole pieces axially separated from any opposed magnetic part of said rings by a distance several times as great as the radial width of said gaps thereby to define the flow of flux when said winding is energized to a toroidal path extending through said gaps, said core having a first circumferentially facing abutment thereon, and a part stationarily mounted independently of said core and providing a second abutment engaging said first abutment to hold the supported core against turning during rotation of said rings.

References Cited in the file of this patent
UNITED STATES PATENTS

| | | |
|---|---|---|
| 2,039,714 | Fuller | May 5, 1936 |
| 2,386,402 | Lilja | Oct. 9, 1945 |

FOREIGN PATENTS

| | | |
|---|---|---|
| 194,274 | Germany | Jan. 22, 1908 |